United States Patent
Guo et al.

(10) Patent No.: US 11,024,868 B2
(45) Date of Patent: Jun. 1, 2021

(54) SECONDARY BATTERY CELL

(71) Applicant: Ningde Amperex Technology Limited, Fujian (CN)

(72) Inventors: Peipei Guo, Fujian (CN); Ping He, Fujian (CN); Yi Zhao, Fujian (CN); Hongxin Fang, Fujian (CN); Wenqiang Cheng, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 146 days.

(21) Appl. No.: 16/203,597

(22) Filed: Nov. 28, 2018

(65) Prior Publication Data
US 2019/0097259 A1 Mar. 28, 2019

Related U.S. Application Data

(63) Continuation of application No. PCT/CN2016/087447, filed on Jun. 28, 2016.

(51) Int. Cl.
 *H01M 10/04* (2006.01)
 *H01M 4/13* (2010.01)
 *H01M 50/538* (2021.01)

(52) U.S. Cl.
 CPC ......... *H01M 10/0431* (2013.01); *H01M 4/13* (2013.01); *H01M 50/538* (2021.01)

(58) Field of Classification Search
 CPC ..... H01M 10/0431; H01M 2/263; H01M 4/13
 See application file for complete search history.

(56) References Cited

U.S. PATENT DOCUMENTS

| | | | | |
|---|---|---|---|---|
| 2009/0305120 | A1* | 12/2009 | Blomgren | H01M 4/661 429/94 |
| 2014/0349179 | A1* | 11/2014 | Chun | H01M 2/1673 429/211 |
| 2015/0207111 | A1* | 7/2015 | Tao | H01M 4/139 429/162 |

FOREIGN PATENT DOCUMENTS

| | | | |
|---|---|---|---|
| CN | 201556685 U | 8/2010 | |
| CN | 203733894 U * | 7/2014 | ............ H01M 4/139 |

(Continued)

OTHER PUBLICATIONS

International Search Report of PCT Patent Application No. PCT/CN2016/087447 dated Mar. 27, 2017.

*Primary Examiner* — Eugenia Wang
(74) *Attorney, Agent, or Firm* — Morgan, Lewis & Bockius LLP

(57) ABSTRACT

The present application provides a second battery cell comprising first and second electrodes, first and second tabs, and a separator. The first electrode and second electrode include first and second current collectors and first and second active material layers respectively. The first and second electrodes are formed with first and second tab accommodating grooves for accommodating the first and second tabs respectively. The first tabs are arranged in pairs, and two first tabs in each pair are respectively located on the upper and lower sides of the first winding starting section of the first electrode along the thickness direction of the secondary battery cell; and/or the second tabs are arranged in pairs, and two second tabs in each pair are respectively located on the upper and lower sides of the second winding starting section of the second electrode along the thickness direction of the secondary battery cell.

16 Claims, 13 Drawing Sheets

(56) References Cited

FOREIGN PATENT DOCUMENTS

| | | |
|---|---|---|
| CN | 203733894 U | 7/2014 |
| CN | 204809314 U | 11/2015 |

* cited by examiner

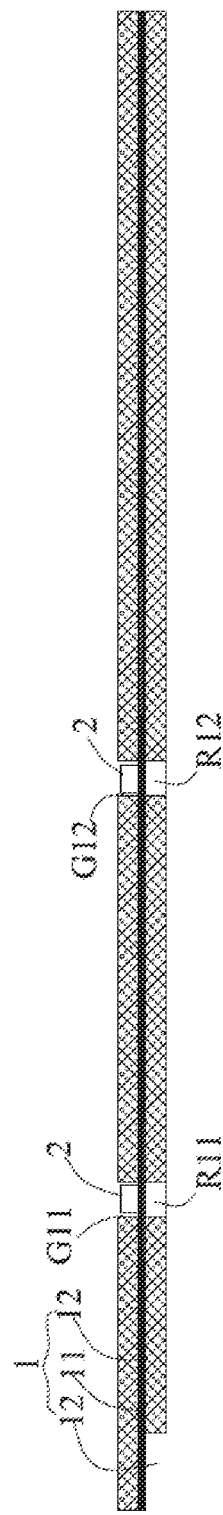
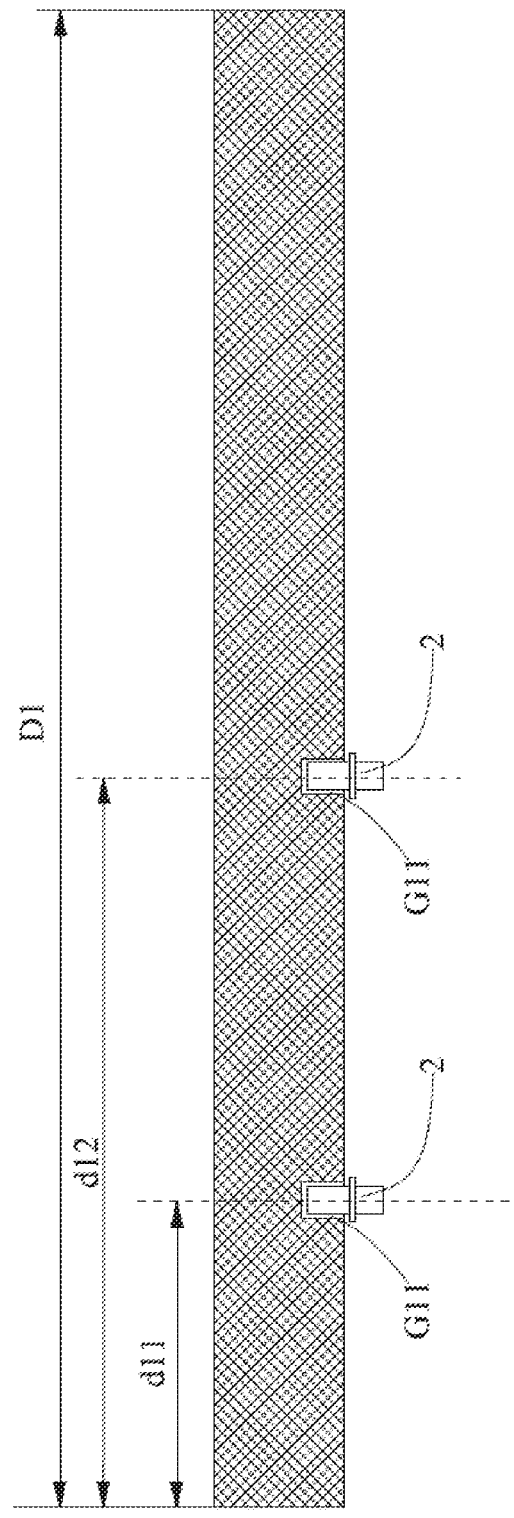
Fig. 6(a)
Fig. 6(b)

SECONDARY BATTERY CELL

CROSS REFERENCE TO RELATED APPLICATION

This application is a continuation application of International Application No. PCT/CN2016/087447 filed on Jun. 28, 2016, the entire contents of which are incorporated herein by reference.

FIELD

The present application relates to the field of electrochemical energy storage device, in particular, to a secondary battery cell.

BACKGROUND

FIG. 10 is a schematic view showing the structure of a secondary battery cell in the prior art after being wound and formed in an embodiment. FIGS. 11(a) to 11(b) are two views of the cathode electrode of the secondary battery cell of FIG. 10 after being unfolded. FIGS. 12(a) to 12(b) are two views of the anode electrode of the secondary battery cell of FIG. 10 after being unfolded.

As shown in FIGS. 10 to 12(b), the head of the anode electrode 1 and the head of the cathode electrode 3 of the secondary battery cell are uncoated regions. And the anode tab 2 and the cathode tab 4 are respectively soldered to the uncoated region at the head of the anode electrode 1 and the uncoated region at the head of the cathode electrode 3, so that the DC resistance (DCR) of the secondary battery cell is enlarged. In addition, an insulating adhesive is also required to be attached to the anode tab 2 and the cathode tab 4, which makes the regions where the anode tab 2 and the cathode tab 4 located to become the thickest regions of the secondary battery. While other spaces of the cell are wasted, resulting in loss of energy density.

Chinese Patent No. CN203733894U, issued on Jul. 23, 2014, discloses a lithium ion battery in which an anode tab accommodating groove G11 is formed on the anode electrode 1 and a cathode tab accommodating groove G31 is formed on the cathode electrode 3, so that the accumulation of thickness of the cell by the tab is reduced, as shown in FIG. 13. By providing the anode tab accommodating groove G11 and the cathode tab accommodating groove G31, the problem of the capacity density loss caused by the accumulation of the thickness of the tab is improved. There will be a huge problem of cyclic deformation since there are only single anode tab 2 and cathode tab 4 respectively located on the same side of the wound cell.

SUMMARY

In view of the problems in the background, it is an object of the present application to provide a secondary battery cell, which may improve the deformation during the cycle of charge and discharge, reduce the DC resistance, and increase the capacity density thereof.

In order to achieve above object, the present application provides a second battery cell including a first electrode, a first tab, a second electrode, a second tab and a separator.

The first electrode includes a first current collector and a first active material layer arranged on the surface of the first current collector. The second electrode includes a second current collector and a second active material layer arranged on the surface of the second current collector. A separator is arranged between the first electrode and the second electrode.

The first electrode includes a first tab accommodating groove defined by the first current collector as a bottom and the first active material as a peripheral side, to accommodate the first tab. The second electrode is formed with a second tab accommodating groove with the bottom being the second current collector and the peripheral side being the second active material layer for accommodating the second tab.

Among them, the first tabs are arranged in pairs, and two first tabs in each pair are respectively located on the upper and lower sides of the first winding starting section of the first electrode along the thickness direction of the secondary battery cell; and/or the second tabs are arranged in pairs, and two second tabs in each pair are respectively located on the upper and lower sides of the second winding starting section of the second electrode along the thickness direction of the secondary battery cell.

The present application has the following advantages:

In the secondary battery cell according to the present application, at least one of the first tab and the second tab is arranged in pairs, and the two of the first tabs and/or the second tabs arranged in pairs are respectively located on the opposite sides of the winding starting sections of the first and second electrodes along the thickness direction of the secondary battery cell. Therefore, after the secondary battery cell forms the secondary battery, the deformation of the battery cell during the cyclic charging and discharging process of the secondary battery is improved and the DC resistance is lowered. Specifically, when the first tabs are arranged in pairs, the two first tabs in each pair are respectively located on the upper and lower sides of the first winding starting section of the first electrode along the thickness direction of the secondary battery cell, so that the deformation of the first electrode during the cyclic charging and discharging process of the secondary battery is improved, thereby improving the overall deformation of the battery cell and reducing the DC resistance. When the second tabs are arranged in pairs, and two second tabs in each pair are respectively located on the upper and lower sides of the second winding starting section of the second electrode along the thickness direction of the secondary battery cell, so that the deformation of the second electrode during the cyclic charging and discharging process of the secondary battery is improved, thereby improving the overall deformation of the battery cell and reducing the DC resistance. In addition, since the first tab is accommodated in the first tab accommodating groove on the first electrode and the second tab is accommodated in the second tab accommodating groove on the second electrode, the energy density of the secondary battery is improved.

BRIEF DESCRIPTION OF THE DRAWINGS

FIGS. 2(a) to 2(c) are three views showing the cathode electrode of the secondary battery cell of FIG. 1 after being unfolded, wherein FIG. 2(a) is a cross-sectional view taken parallel to the direction of the paper of FIG. 1, FIG. 2 (b) is a bottom view, and FIG. 2(c) is a top view;

FIGS. 3(a) to 3(b) are two views showing the anode electrode of the secondary battery cell of FIG. 1 after being unfolded, wherein FIG. 3(a) is a cross-sectional view taken parallel to the direction of the paper of FIG. 1, and FIG. 3(b) is a top view;

FIGS. 5(a) to 5(c) are three views showing the cathode electrode of the secondary battery cell of FIG. 4 after being unfolded, wherein FIG. 5(a) is a cross-sectional view taken parallel to the direction of the paper of FIG. 1, FIG. 5 (b) is a bottom view, and FIG. 5(c) is a top view;

FIGS. 6(a) to 6(b) are two views showing the anode electrode of the secondary battery cell of FIG. 4 after being unfolded, wherein FIG. 6(a) is a cross-sectional view taken parallel to the direction of the paper of FIG. 1 and FIG. 6(b) is a top view;

FIGS. 8(a) to 8(c) are three views showing the cathode electrode of the secondary battery cell of FIG. 7 after being unfolded, wherein FIG. 8(a) is a cross-sectional view taken parallel to the direction of the paper of FIG. 1; FIG. 8 (b) is a bottom view, and FIG. 8(c) is a top view;

FIGS. 9(a) to 9(b) are two views showing the anode electrode of the secondary battery cell of FIG. 7 after being unfolded, wherein FIG. 9(a) is a cross-sectional view taken parallel to the direction of the paper of FIG. 1 and FIG. 9(b) is a top view;

FIGS. 11(a) to 11(b) are two views showing the cathode electrode of the secondary battery cell of FIG. 10 after being unfolded, wherein FIG. 11(a) is a cross-sectional view taken parallel to the direction of the paper of FIG. 1 and FIG. 11(b) is a bottom view;

FIGS. 12(a) to 12(b) are two views showing the anode electrode of the secondary battery cell of FIG. 10 after being unfolded, wherein FIG. 12(a) is a cross-sectional view taken parallel to the direction of the paper of FIG. 1 and FIG. 12(b) is a top view;

Figure 1:
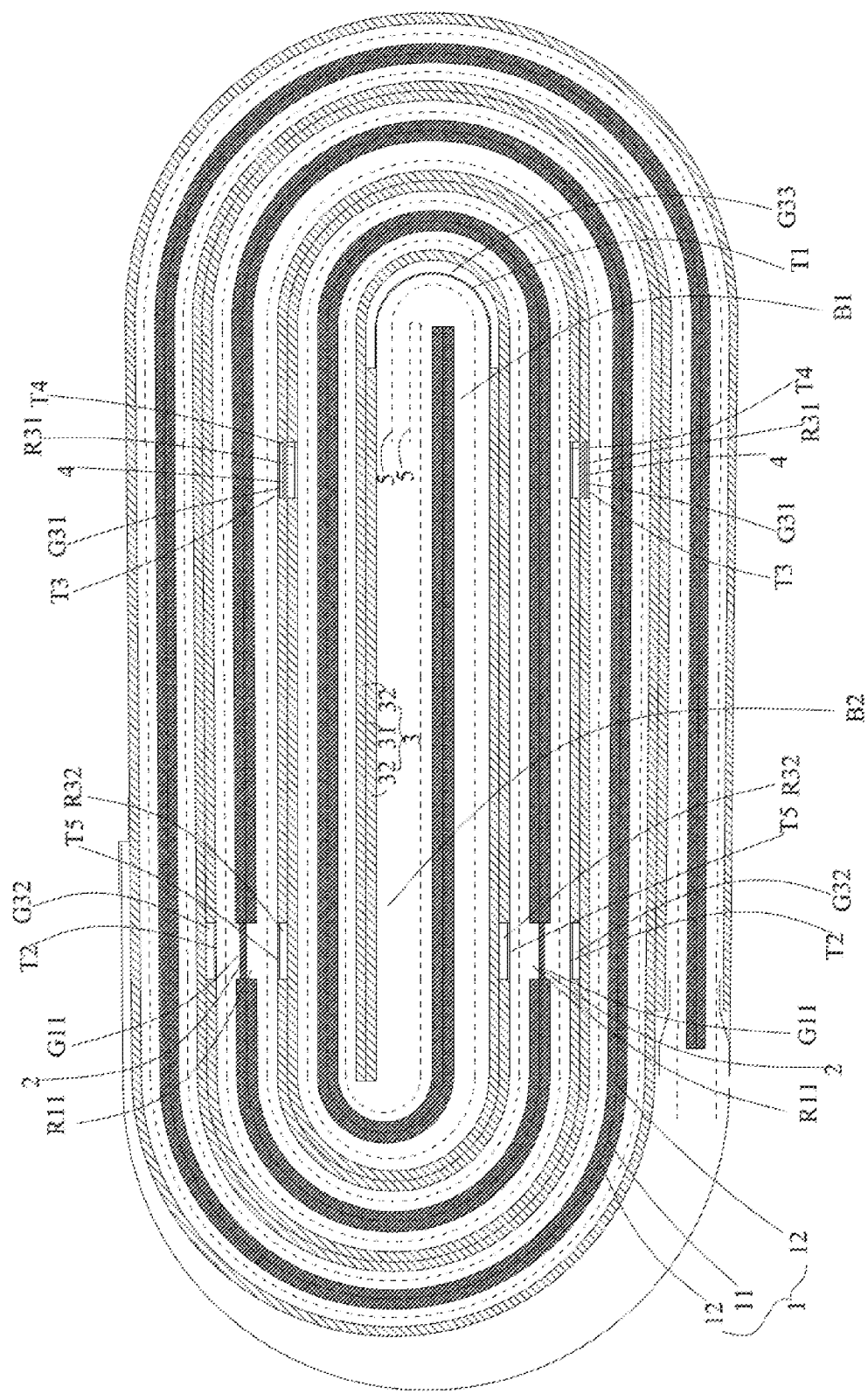
FIG. 1 is a schematic view showing the structure of a secondary battery cell according to the present application after being wound and formed in an embodiment.

Among those, the reference numerals are as follows:
1 anode electrode,
11 anode current collector,
12 anode active material layer,
B1 anode winding starting section,
G11 anode tab accommodating groove,
R11 anode mating recess,
2 anode tab,
3 cathode electrode,
31 cathode current collector,
32 cathode active material layer,
B2 cathode winding starting section,
G31 cathode tab accommodating groove,
G32 cathode electrode contrapuntal groove,
G33 cathode groove opposite the anode head,
R31 cathode mating recess,
R32 cathode electrode contrapuntal recess
4 cathode tab
5 separator
T1 first insulating tape arranged on the cathode electrode opposite the anode head, T2 second insulating tape arranged on the cathode electrode opposite the anode tab accommodating groove,
T3 third insulating tape arranged for the cathode tab accommodating groove,
T4 fourth insulating tape arranged for cathode mating recess,
T5 fifth insulating tape arranged on the cathode electrode, opposite the anode mating recess,
T6 sixth insulating tape arranged for the anode tab,
T7 seventh insulating tape arranged for the cathode tab.

DETAILED DESCRIPTION OF THE PREFERRED EMBODIMENTS

The secondary battery cell of the present application will be described in detail below with reference to the drawings.

Embodiments of the present application are described herein. It is to be understood, however, that the disclosed embodiments are merely examples and other embodiments may take various and alternative forms. Herein, the wordings of "first . . . " refers to "anode" and "second . . . " refers to "cathode" in the following schematic embodiments. For example, "a first electrode" corresponds to "an anode electrode" and "a second electrode" corresponds to "a cathode electrode".

Further, it should be understood that "first . . . " and "second . . . " may refer to "cathode" and "anode" respectively in alternative other embodiments.

With reference to FIGS. 1, 2(a) to 2(c), 3(a) to 3(b), 4, 5(a) to 5(c), 6(a) to 6(b), 7, 8(a) to 8(c), 9(a), and 9(b), the second battery cell of present application includes an anode electrode 1, an anode tab 2, a cathode electrode 3, a cathode tab 4 and a separator 5.

The anode electrode 1 includes an anode current collector 11 and an anode active material layer 12 arranged on the surface of the anode current collector 11. The cathode electrode 3 includes a cathode current collector 31 and a cathode active material layer 32 arranged on the surface of the cathode current collector 31. The separator 5 is arranged between the anode electrode 1 and the cathode electrode 3.

The anode electrode 1 is formed with an anode tab accommodating groove G11 for accommodating the anode tab 2, wherein the anode tab accommodating groove G11 is defined by the anode current collector 11 as a bottom and the anode active material layer 12 as a peripheral side. The cathode electrode 3 is formed with a cathode tab accommodating groove G31 for accommodating the cathode tab 4, wherein the cathode tab accommodating groove G31 is defined by the cathode current collector 31 as a bottom and the cathode active material layer 32 as a peripheral side.

Among them, the anode tabs 2 are arranged in pairs, and two anode tabs 2 in each pair are respectively located on the upper and lower sides of the anode winding starting section B1 of the anode electrode 1 along the thickness direction of the secondary battery cell; and/or the cathode tabs 4 are arranged in pairs, and two cathode tabs 4 in each pair are respectively located on the upper and lower sides of the cathode winding starting section B2 of the cathode electrode 3 along the thickness direction of the secondary battery cell.

In the secondary battery cell according to the present application, at least one of the anode tab 2 and the cathode tab 4 is arranged in pairs, and the two of the anode tabs 2 and/or the cathode tabs 4 arranged in pairs are respectively located on the opposite sides of the winding starting sections of the first and second electrode along the thickness direction of the secondary battery cell. Therefore, after the secondary battery cell forms the secondary battery, the deformation of the cell during the cyclic charging and discharging process of the secondary battery is improved and the DC resistance is lowered. Specifically, when the anode tabs 2 are arranged in pairs, and two anode tabs 2 in each pair are respectively located on the upper and lower sides of the anode winding starting section B1 of the anode electrode 1 along the thickness direction of the secondary battery cell, so that the deformation of the anode electrode 1 during the cyclic charging and discharging process of the secondary battery is improved, thereby improving the overall deformation of the cell and reducing the DC resistance. When the cathode tabs 4 are arranged in pairs, and two cathode tabs 4 in each pair are respectively located on the upper and lower sides of the cathode winding starting section B2 of the cathode electrode 3 along the thickness direction of the secondary battery cell, so that the deformation of the cathode electrode 3 during the cyclic charging and discharging process of the secondary battery is improved, thereby improving the overall deformation of the cell and reducing the DC resistance. In addition, since the anode tab 2 is accommodated in the anode tab accommodating groove G11 on the anode electrode 1 and the cathode tab 4 is accommodated in the cathode tab accommodating groove G31 on the cathode electrode 3, the energy density of the secondary battery is improved.

Among them, the anode winding starting section B1 generally refers to the portion between the winding head of the anode electrode 1 and the first bend of the anode electrode 1; the cathode winding starting section B2 generally refers to the portion between the winding head of the cathode electrode 3 and the first bend of the cathode electrode 3.

In the secondary battery cell according to the present application, the peripheral side of the anode tab accommodating groove G11 includes one opening and three side walls (i.e. a non-penetration groove), or the peripheral side of the anode tab accommodating groove G11 includes two openings and two side walls (i.e. a penetration groove). The cathode tab accommodating groove G31 may also be constructed in such way.

Figure 4:
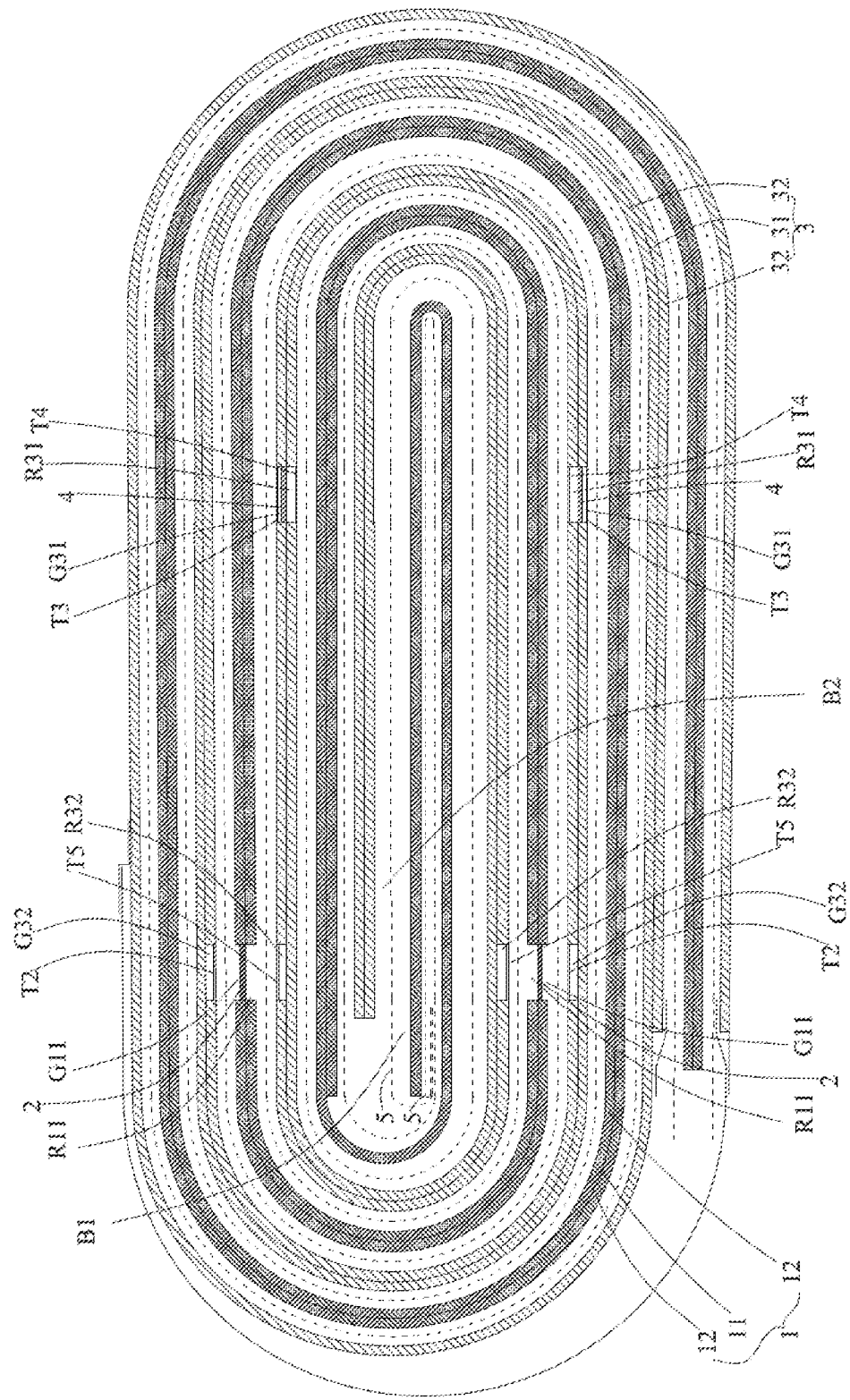
FIG. 4 is a schematic view showing the structure of a secondary battery cell according to the present application after being wound and formed in another embodiment.
Figure 5A:
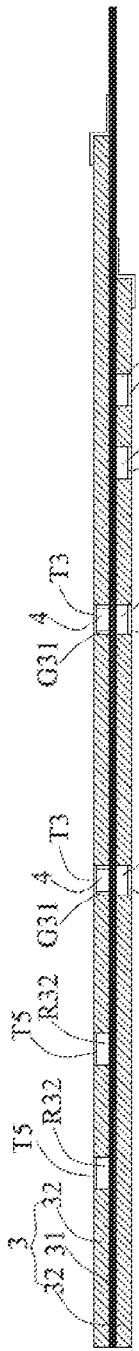
Figure 5B:
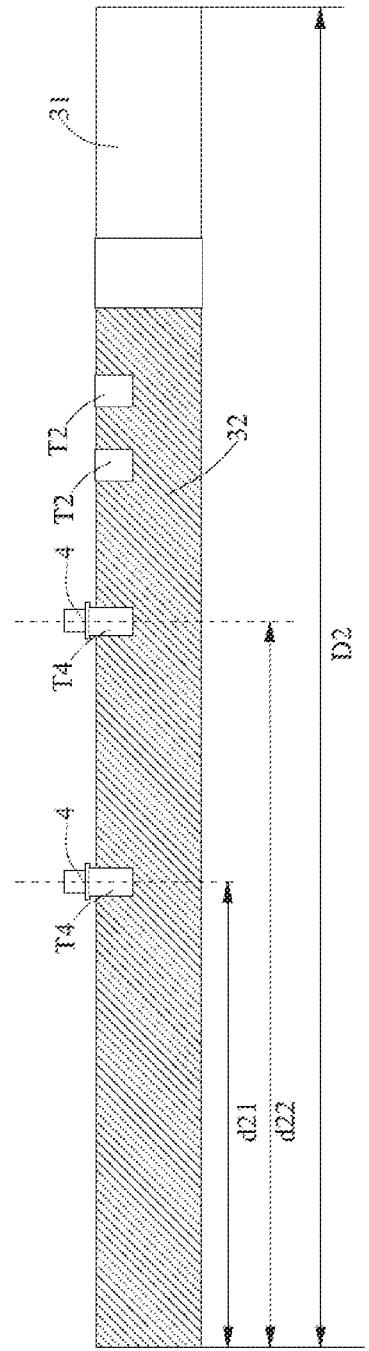
Figure 5C:
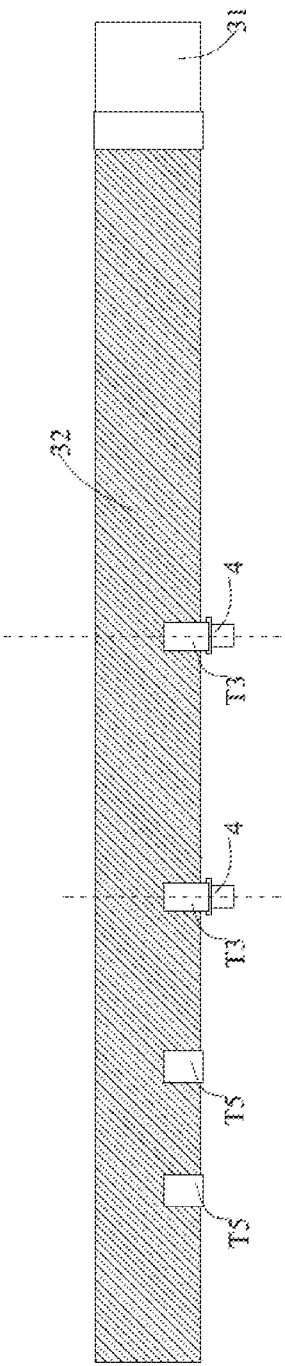
Figure 7:
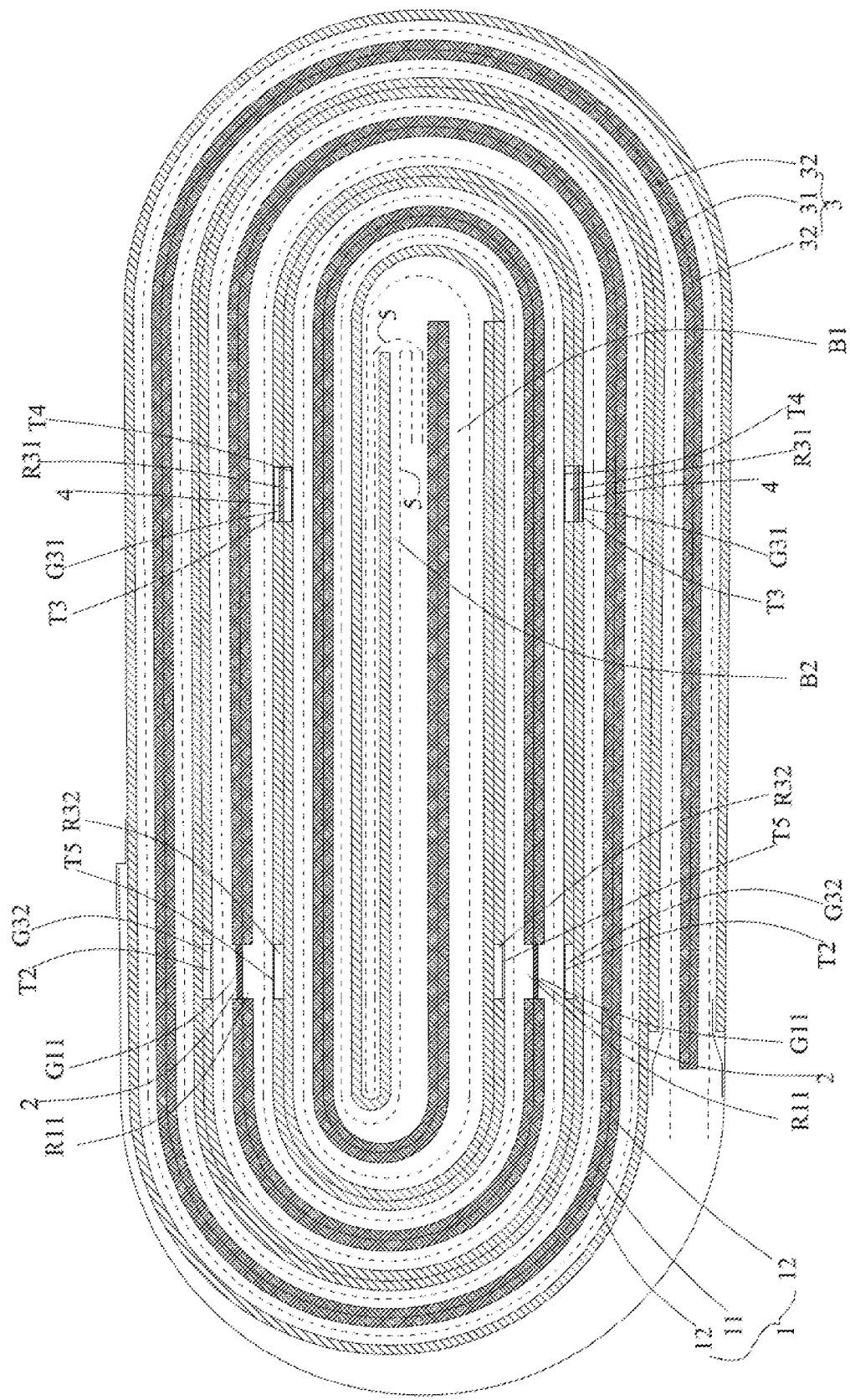
FIG. 7 is a schematic view showing the structure of a secondary battery cell according to the present application after being wound and formed in yet another embodiment.
Figure 8A:
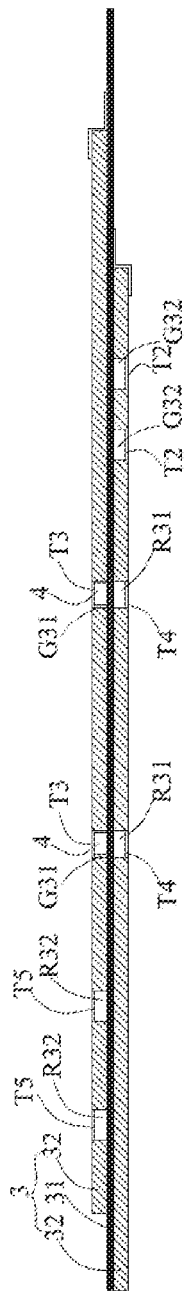
Figure 8B:
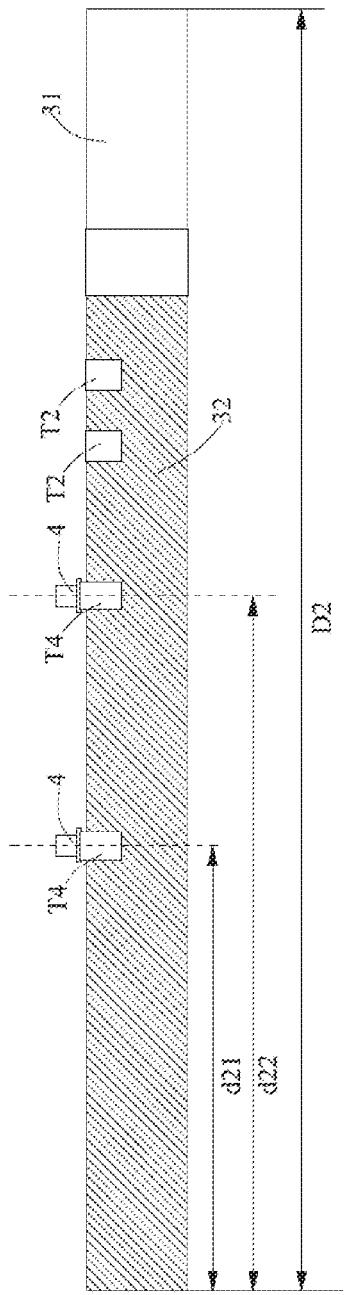
Figure 8C:
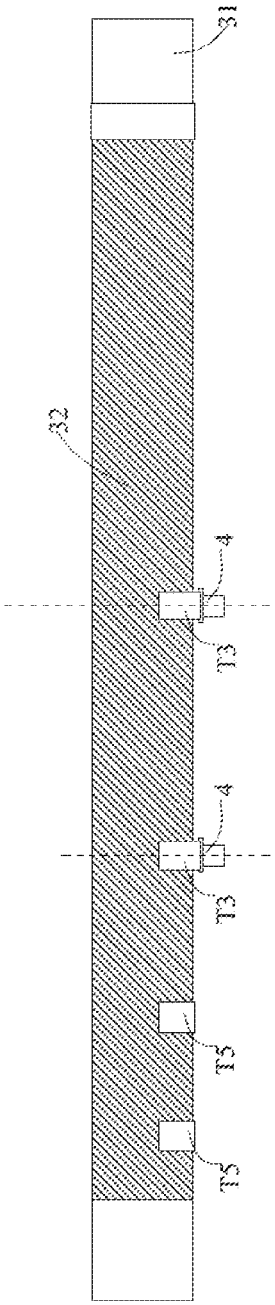
Figure 9A:
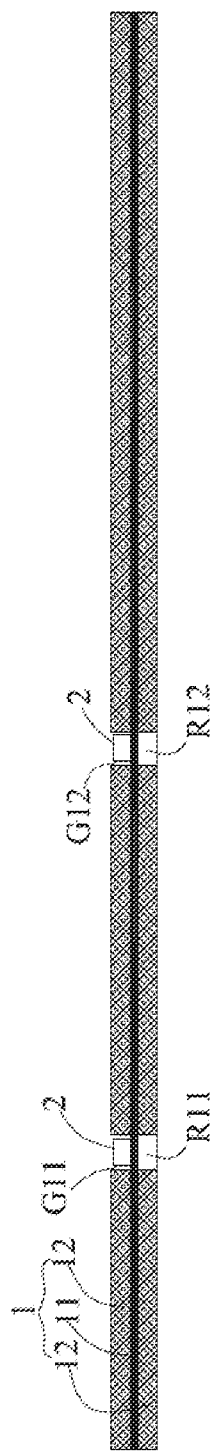
Figure 9B:
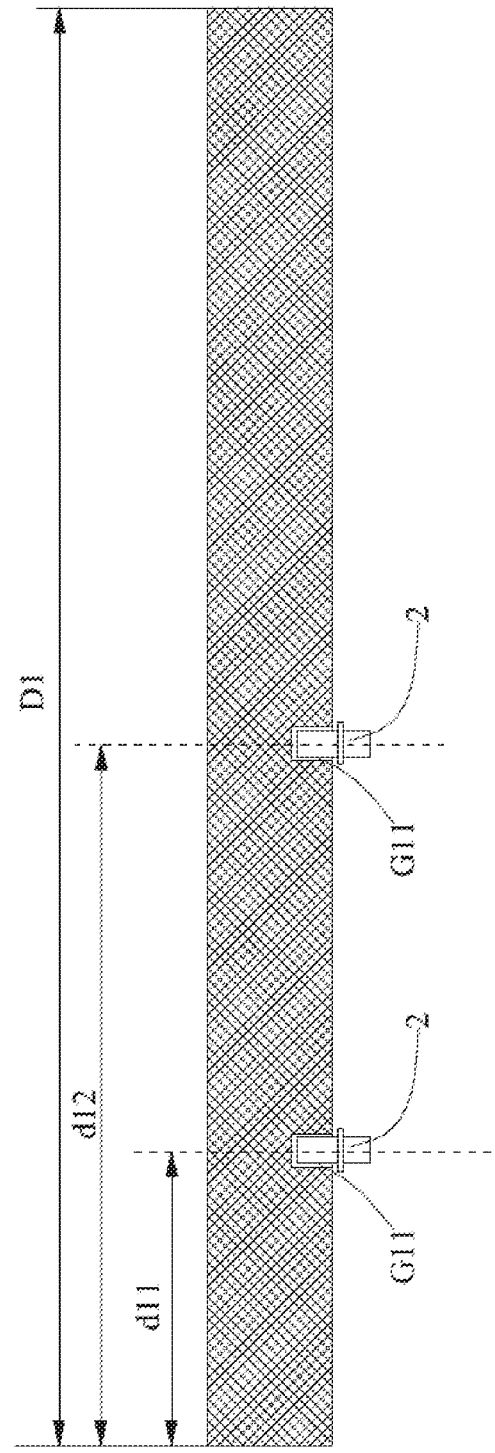
Figure 10:
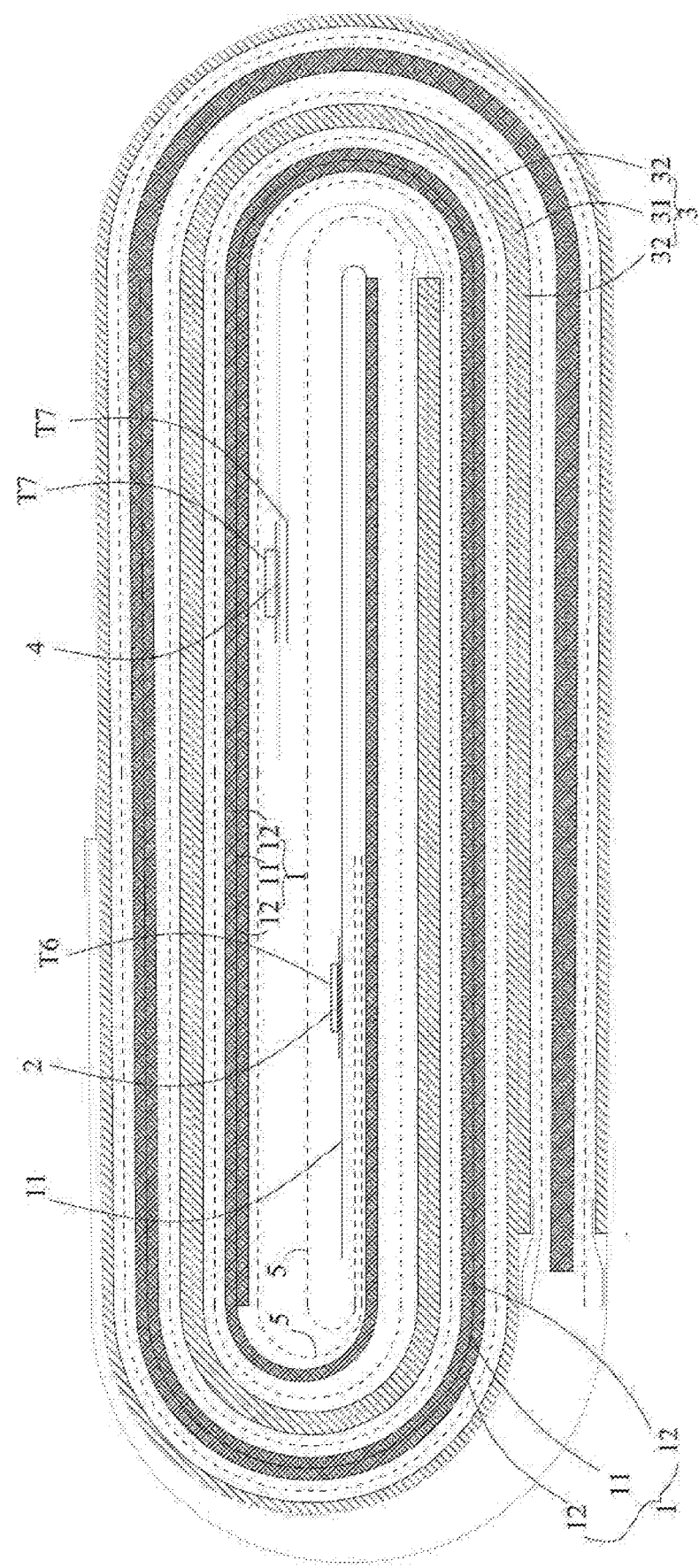
FIG. 10 is a schematic view showing the structure of a secondary battery cell in the prior art after being wound and formed in an embodiment.
Figure 11A:
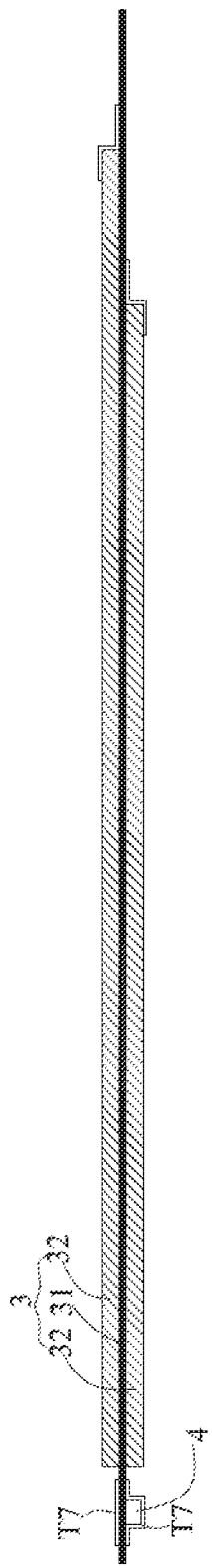
Figure 11B:
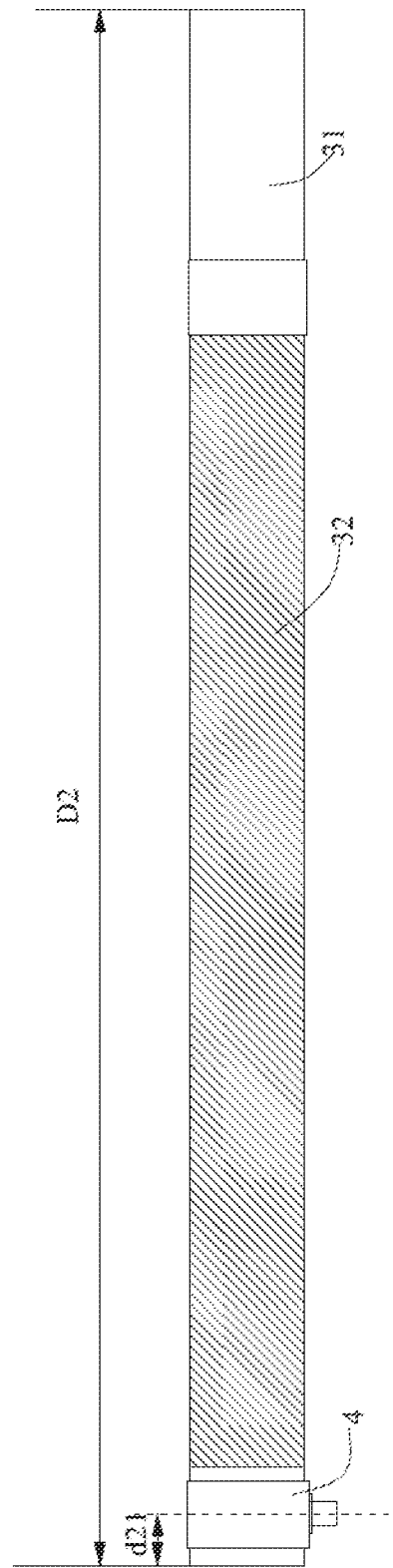
Figure 12A:
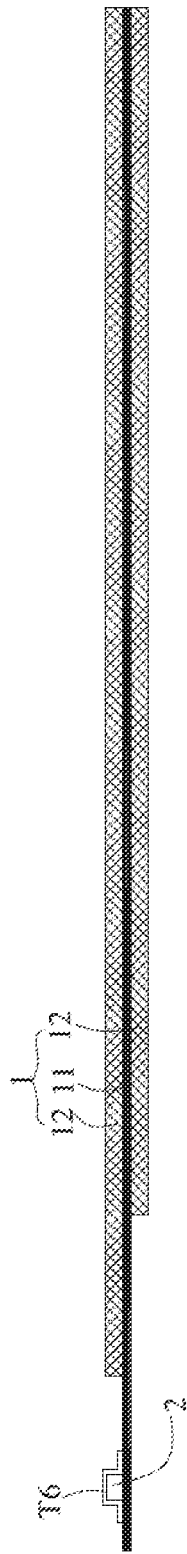
Figure 12B:
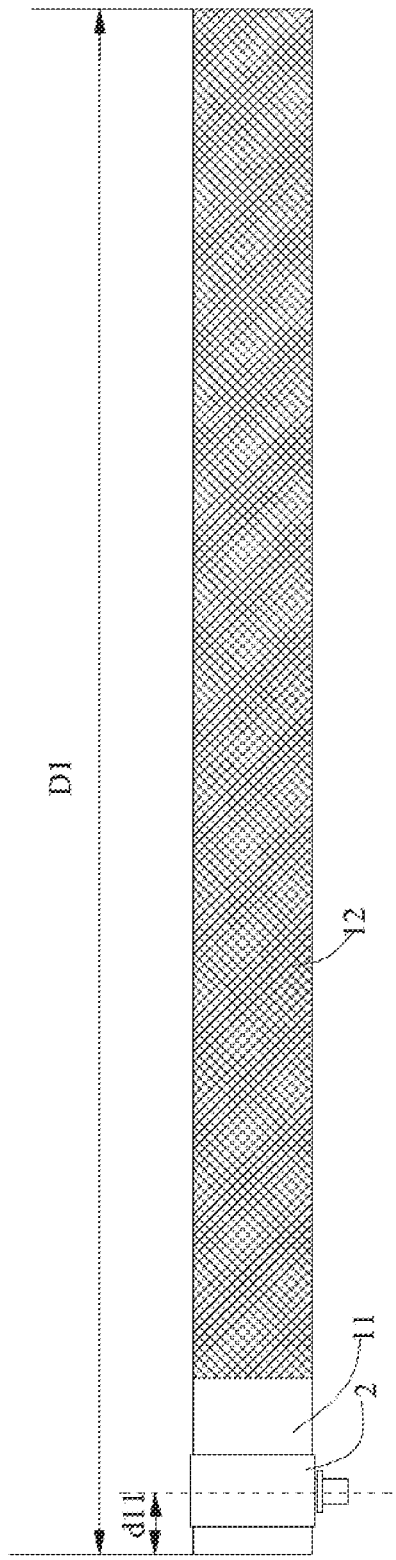
Figure 13:
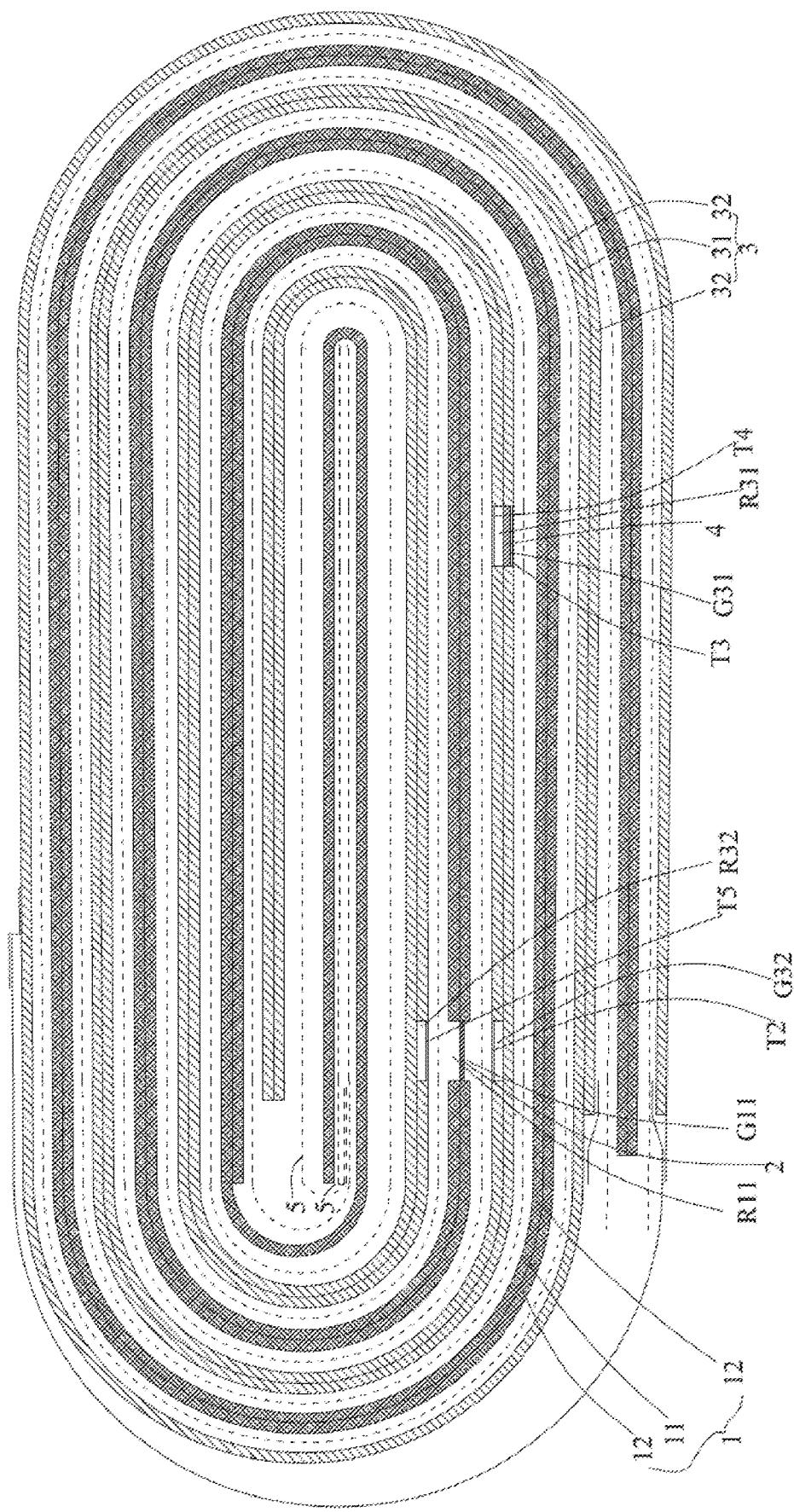
FIG. 13 is a schematic view showing the structure of a secondary battery cell in the prior art after being wound and formed in another embodiment.

In the secondary battery cell according to the present application, with reference to FIGS. 1, 4 and 7, the cathode electrode 3 is further formed with a cathode electrode contrapuntal groove G32 located in a region of the cathode electrode 3 facing to the anode tab accommodating groove G11. Since the cathode electrode contrapuntal groove G32 faces to the anode tab 2, the cathode active material which frees to the anode tab 2 is reduced, the free diffusion of the cathode active material to the aligned anode tab 2 is reduced, the enrichment of the cathode active material at the anode tab 2 during charging and discharging of the secondary battery is further mitigated, and finally the problem of precipitation of cathode active material at the anode tab 2 is reduced, further improving the safety performance of the secondary battery. In addition, since the cathode electrode contrapuntal groove G32 has no cathode active material, the energy density of the secondary battery is improved when the secondary battery cell forms a secondary battery.

In an embodiment, the cathode electrode contrapuntal groove G32 may be a non-penetration groove. In the secondary battery cell according to the present application, a length and a width of the cathode electrode contrapuntal groove G32 are greater than the length and width of the anode tab accommodating groove G11.

In an embodiment, the anode tabs 2 may include one or more pairs.

In an embodiment, the cathode tabs 4 may include one or more pairs.

Figure 2A:
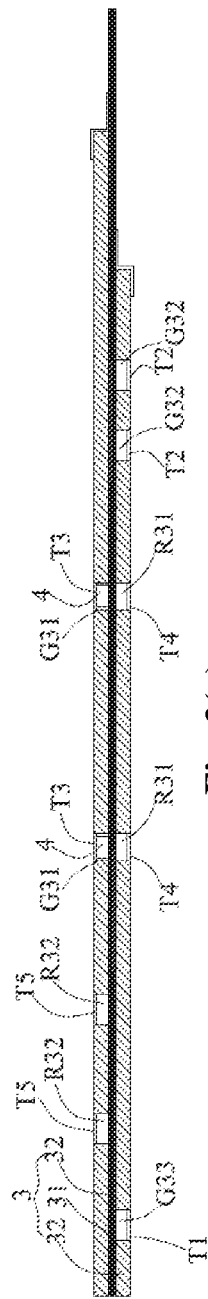
Figure 2B:
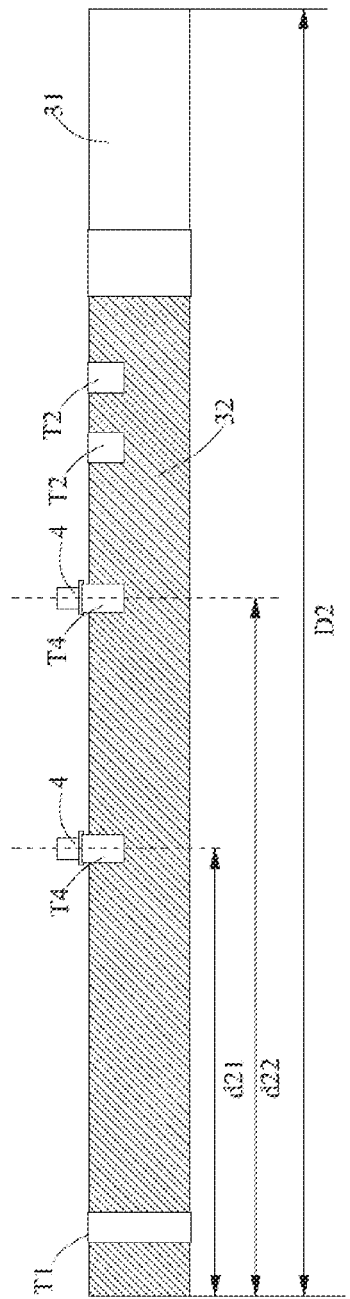
Figure 2C:
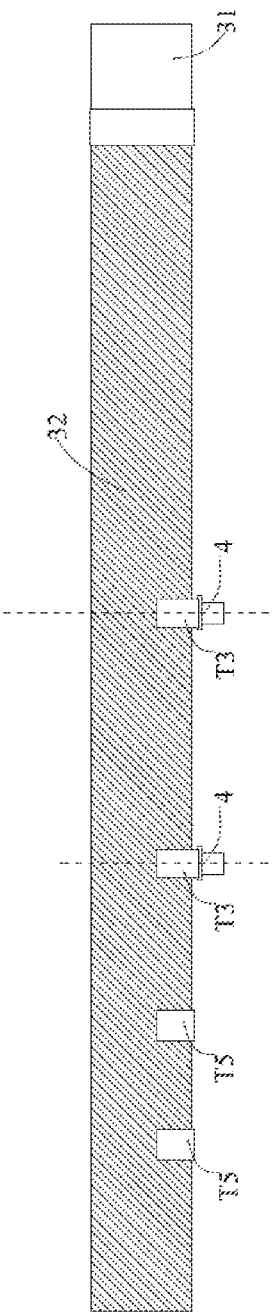
Figure 3A:
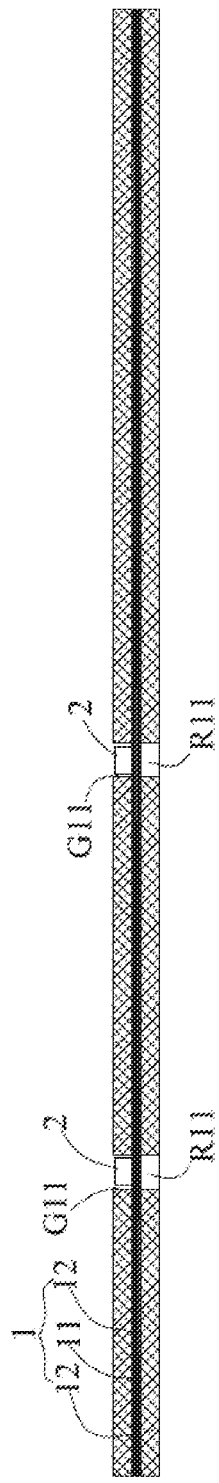
Figure 3B:
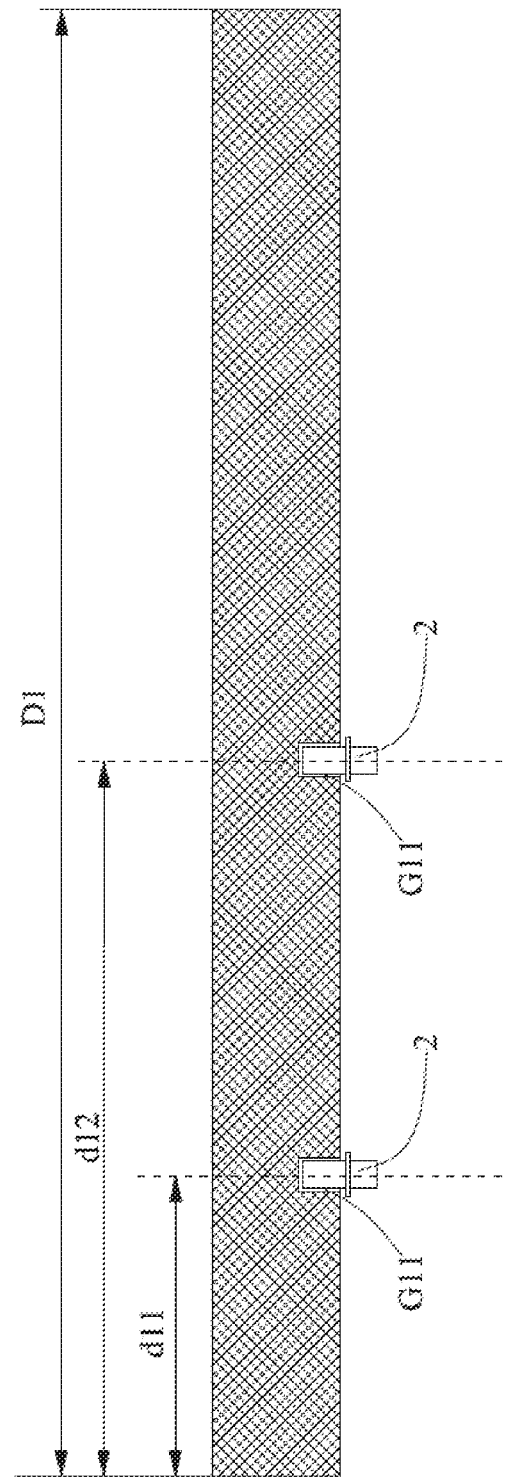

In the secondary battery cell according to the present application, with reference to FIGS. 1, 2(a) and 2(b), the secondary battery cell further includes a first insulating tape T1 arranged on the cathode electrode opposite the anode starting end, covering a region of the cathode electrode 3 that faces to the anode starting end.

In an embodiment, with reference to FIG. 1, the cathode electrode 3 is further formed with a cathode groove G33 opposite the anode head, wherein the cathode groove is located on a region of the cathode electrode 3 that is aligned with the anode head, and the first insulating tape T1 covers the cathode groove G33.

In an embodiment, the cathode groove G33 may be a penetration groove.

In an embodiment, the width of the first insulating tape T1 may be 2 mm to 25 mm, and the length of the first insulating tape T1 may be 1 to 1.2 times of the width of the cathode electrode 1.

In the secondary battery cell according to the present application, with reference to FIGS. 1 to 2(b), 4 to 5(b) and 7 to 8(b), the secondary battery cell further includes a second insulating tape T2 arranged on the cathode electrode opposite the anode tab accommodating groove, wherein the second insulating tape T2 covers the entire region of the cathode electrode 3 that is aligned with the anode tab accommodating groove G11.

In an embodiment, the width of the second insulating tape T2 may be 1 to 1.5 times of the width of the anode tab accommodating groove G11, and the length of the second insulating tape T2 may be 1 to 1.5 times of the length of the anode tab accommodating groove G11.

In the secondary battery cell according to the present application, with reference to FIGS. 1, 2(a) to 2(c), 4, 5(a) to 5(b) and 7, 8(a) to 8(b), the secondary battery cell further includes a third insulating tape T3 arranged for the cathode tab accommodating groove, wherein the third insulating tape T3 covering the cathode tab 4 and a part of the cathode tab accommodating groove G31 around the cathode tab 4.

In an embodiment, the width of the third insulating tape T3 may be 0.5 to 1.5 times of the width of the cathode tab accommodating groove G31, and the length of the third insulating tape T3 may be 0.5 to 1.5 times of the length of the cathode tab accommodating groove G31.

In an embodiment, the anode tab 2 is electrically connected to the anode current collector 11 at the anode tab accommodating groove G11 by ultrasonic welding, laser welding, thermo-compression welding, or conductive adhesive bonding.

In an embodiment, the cathode tab 4 is electrically connected to the cathode current collector 31 at the cathode tab accommodating groove G31 by ultrasonic welding, laser welding, thermo-compression welding, or conductive adhesive bonding.

In an embodiment, the anode tab accommodating groove G11 may be formed by removing a corresponding portion of the anode active material layer 12 by laser cleaning or mechanical cleaning to expose the cathode current collector 11; or the anode tab accommodating groove G11 may be formed by pre-loading an adhesive paper on the anode current collector 11 before coating an anode active material layer slurry, then coating and drying the anode active material layer slurry to form the anode active material layer 12, and peeling off the adhesive paper from the anode current collector 11 when the anode active material layer slurry is dried.

In an embodiment, the cathode tab accommodating groove G31 may be formed by removing a corresponding portion of the cathode active material layer 32 by laser cleaning or mechanical cleaning to expose the cathode current collector 31; or the cathode tab accommodating groove G31 may be formed by pre-loading an adhesive paper on the cathode current collector 31 before coating a cathode active material layer slurry, then coating and drying the cathode active material layer slurry to form the cathode active material layer 32, and peeling off the adhesive paper from the cathode current collector 31 when the cathode active material layer slurry is dried.

In an embodiment, the cathode electrode contrapuntal groove G32 may be formed by removing a corresponding portion of the cathode active material layer 32 by laser cleaning or mechanical cleaning to expose the cathode current collector 31; or the cathode electrode contrapuntal groove G32 may be formed by pre-loading an adhesive paper on the cathode current collector 31 before coating a cathode active material layer slurry, then coating and drying the cathode active material layer slurry to form the cathode active material layer 32, and peeling off the adhesive paper from the cathode current collector 31 when the cathode active material layer slurry is dried.

In an embodiment, the cathode groove G33 may be formed by removing a corresponding portion of the cathode active material layer 32 by laser cleaning or mechanical cleaning to expose the cathode current collector 31; or the cathode groove G33 may be formed by pre-loading an adhesive paper on the cathode current collector 31 before coating a cathode active material layer slurry, then coating and drying the cathode active material layer slurry to form the cathode active material layer 32, and peeling off the adhesive paper from the cathode current collector 31 when the cathode active material layer slurry is dried.

In an embodiment, the first insulating tape T1 may be a single-sided insulating tape in which one side is tacky, or a double-sided insulating tape in which both sides are initially tacky or one side is initially tacky and the other side is tacky after subsequent hot pressing or cold pressing.

In an embodiment, the second insulating tape T2 may be a single-sided insulating tape in which one side is tacky, or a double-sided insulating tape in which both sides are initially tacky or one side is initially tacky and the other side is tacky after subsequent hot pressing or cold pressing.

In an embodiment, the third insulating tape T3 may be a single-sided insulating tape in which one side is tacky, or a double-sided insulating tape in which both sides are initially tacky or one side is initially tacky and the other side is tacky after subsequent hot pressing or cold pressing.

In the secondary battery cell according to the present application, with reference to FIGS. 1, 2(a), 4, 5(a) and 7 and 8(a), the cathode electrode 3 is further formed with a cathode mating recess R31 defined by the cathode current collector 31 as a bottom and the cathode active material layer 32 as a peripheral side, wherein the cathode mating recess R31 is located on the opposite backside of the cathode tab accommodating groove G31. The arrangement of the cathode mating recess R31 facilitates ultrasonic welding of the cathode tab 4 into the cathode tab accommodating groove G31.

In an embodiment, the cathode mating recess R31 may be a non-penetration groove.

In the secondary battery cell according to the present application, with reference to FIGS. 1, 2(a), 4, 5(a) and 7 and 8(a), the secondary battery cell may further include a fourth insulating tape T4 arranged for cathode mating recess, wherein the fourth insulating tape T4 covers the cathode mating recess R31. In an embodiment, the width of fourth insulating tape T4 may be 0.5 to 1.5 times of the width of the cathode tab accommodating groove G31, and the length of the fourth insulating tape T4 may be 0.5 to 1.5 times of the length of the cathode tab accommodating groove G31.

In an embodiment, the cathode mating recess R31 may be formed by removing a corresponding portion of the cathode active material layer 32 by laser cleaning or mechanical cleaning to expose the cathode current collector 31; or the cathode mating recess R31 may be formed by pre-loading an adhesive paper on the cathode current collector 31 before coating a cathode active material layer slurry, then coating and drying the cathode active material layer slurry to form the cathode active material layer 32, and peeling off the adhesive paper from the cathode current collector 31 when the cathode active material layer slurry is dried.

In an embodiment, the fourth insulating tape T4 may be a single-sided insulating tape in which one side is tacky, or a double-sided insulating tape in which both sides are initially tacky or one side is initially tacky and the other side is tacky after subsequent hot pressing or cold pressing.

In the secondary battery cell according to the present application, with reference to FIGS. 1, 3(a), 4, 6(a) and 7 and 9(a), the anode electrode 1 is further formed with an anode mating recess R11 located on the opposite backside of the anode tab accommodating groove G11. The arrangement of the anode mating recess R11 facilitates ultrasonic welding of the anode tab 2 into the anode tab accommodating groove G11. With reference to FIGS. 1, 2(a), 4, 5(a) and 7 and 8(a), the cathode electrode 3 is further formed with a cathode electrode contrapuntal recess R32, disposed in a region of the cathode electrode 3 and faces to the anode mating recess R11, and a length and a width of the cathode electrode contrapuntal recess R32 are greater than a length and a width of the anode mating recess R11, respectively.

In an embodiment, the anode mating recess R11 may be a non-penetration groove, and the cathode electrode contrapuntal recess R32 may also be a non-penetration groove.

In the secondary battery cell according to the present application, with reference to FIGS. 1, 2(a), 4, 5(a) and 7 to 8(a), a fifth insulating tape T5 is arranged on the cathode electrode, opposite the anode mating recess, wherein the fifth insulating tape covers a region of the cathode electrode 3 that is aligned with the anode mating recess R11.

In an embodiment, the anode mating recess R11 may be formed by removing a corresponding portion of the anode active material layer 12 by laser cleaning or mechanical cleaning to expose the anode current collector 11; or the anode mating recess R11 may be formed by pre-loading an adhesive paper on the anode current collector 11 before coating an anode active material layer slurry, then coating and drying the anode active material layer slurry to form the anode active material layer 12, and peeling off the adhesive paper from the anode current collector 11 when the anode active material layer slurry is dried.

In an embodiment, the cathode electrode contrapuntal recess R32 may be formed by removing a corresponding portion of the cathode active material layer 32 by laser cleaning or mechanical cleaning to expose the cathode current collector 31; or the cathode electrode contrapuntal recess R32 may be formed by pre-loading an adhesive paper on the cathode current collector 31 before coating a cathode active material layer slurry, then coating and drying the cathode active material layer slurry to form the cathode active material layer 32, and peeling off the adhesive paper from the cathode current collector 31 when the cathode active material layer slurry is dried.

In an embodiment, the fifth insulating tape T5 is a single-sided insulating tape in which one side is tacky, or a double-sided insulating tape in which both sides are initially tacky or one side is initially tacky and the other side is tacky after subsequent hot pressing or cold pressing.

In the secondary battery cell according to the present application, the width of the anode tab accommodating groove G11 may be 1 to 5 times of the width of the anode tab 2, the length of the anode tab accommodating groove G11 may be 1 to 5 times of the length of the portion of the anode tab 2 accommodated in the anode tab accommodating groove G11, and the depth of the anode tab accommodating groove G11 may be equal to the thickness of the anode active material layer 12.

In the secondary battery cell according to the present application, the width of the cathode tab accommodating groove G31 may be 1 to 5 times of the width of the cathode tab 4, the length of the cathode tab accommodating groove G31 may be 1 to 5 times of the length of the portion of the cathode tab 4 accommodated in the cathode tab accommodating groove G31, and the depth of the cathode tab accommodating groove G31 may be equal to the thickness of the cathode active material layer 32.

In the secondary battery cell according to the present application, with reference to FIGS. 3(a) to 3(b), 6(a) to 6(b) and 9(a) to 9(b), the anode electrode 1 may be a unitary electrode, and the secondary battery cell is a wound cell. In the unfolded state of the anode electrode 1, the distance from the head to the tail of the anode electrode 1 is defined as D1. The distance between the center line of the first anode tab accommodating groove G11 starting from the head of the anode electrode 1 and the head of the anode electrode 1 is defined as d11. And the distance between the center line of the second anode tab accommodating groove G11 and the head of the anode electrode 1 is defined as d12, and so on for each of the third and subsequent anode tab accommodating groove G11. These distances are all in the range of $1/100$ D1 to $7/10$ D1 calculated from the head of the anode electrode 1. Preferably, each distance may be in the range of $3/100$ D1~$7/10$ D1 calculated from the head of the anode electrode 1, which is more advantageous for reducing the DC resistance (Direct Current Resistance) of the secondary battery cell. This is because the closer the distance is to the intermediate position of the anode electrode 1 (i.e., ½ D1), the smaller the DCR is.

In an embodiment, only one surface of the anode current collector 11 on the winding starting section B1 of the anode electrode 1 is arranged with the anode active material layer 12.

In the secondary battery cell according to the present application, with reference to FIGS. 2(a) to 2(c), 5(a) to 5(c) and 8(a) to 8(c), the cathode electrode 3 may be a unitary electrode, and the secondary battery cell is a wound cell. In the unfolded state of the cathode electrode 3, the distance from the head to the tail of the cathode electrode 3 is defined as D2. The distance between the center line of the first cathode tab accommodating groove G31 starting from the head of the cathode electrode 3 and the head of the cathode electrode 3 is defined as d21. And the distance between the center line of the second cathode tab accommodating groove G31 and the head of the cathode electrode 3 is defined as d22, and so on for each of the third and subsequent cathode tab accommodating groove G31. These distances are all in the range of $1/100$ D2 to $7/10$ D2 calculated from the head of the cathode electrode 3. Preferably, each distance may be in the range of $3/100$ D2~$7/10$ D2 calculated from the head of the cathode electrode 3, which is more advantageous for reducing the DC resistance of the secondary battery cell. This is because the closer the distance is to the intermediate position of the cathode electrode 3 (i.e., ½ D1), the smaller the DCR is.

In the secondary battery cell according to the present application, with reference to FIGS. 1, 4 and 7, the projection of each pair of the anode tabs 2 along the thickness direction of the secondary battery cell coincides with each other, and the projection of each pair of the cathode tabs 4 along the thickness direction of the secondary battery cell coincides with each other.

Finally, it is noted that the double-sided insulating tape mentioned above includes a substrate and a glue layer coated on both surfaces of the substrate. The glue layer of the double-sided insulating tape in which both sides are initially tacky may be a styrene butadiene rubber layer, a polyurethane layer, a polyacrylic acid layer or a polyvinylidene fluoride layer. In the double-sided insulating tape in which one side is initially tacky and the other side is tacky after subsequent hot pressing or cold pressing, the glue layer in which one side is initially tacky may be a styrene butadiene rubber layer, a polyurethane layer, a polyacrylic acid layer or a polyvinylidene fluoride layer; the glue layer in which the other side is tacky after subsequent hot pressing or cold pressing may be a temperature-sensitive adhesive without initial tack at normal temperature or a pressure-sensitive adhesive without initial tack at normal temperature. The temperature-sensitive adhesive without initial tack at normal temperature refers to a temperature-sensitive adhesive which does not cause adhesion to an object when a short-term contact occurs between the object and the temperature-sensitive adhesive at a normal temperature. The pressure-sensitive adhesive without initial tack at normal temperature refers to a pressure-sensitive adhesive which does not cause adhesion to an object when a short contact occurs between the object and the pressure-sensitive adhesive under finger pressure at a normal temperature. The temperature-sensitive adhesive without initial tack at normal temperature may be selected from one or more of polyolefin, polyvinyl butyral, polyamide, and polyester. The pressure-sensitive adhesive without initial tack at normal temperature may be selected from one or more of ethylene-butylene-polystyrene linear triblock copolymer (SEBS), styrene-butadiene block copolymer (SEPS), and epoxidized styrene-isoprene-styrene block copolymer (ESIS).

What is claimed is:

1. A secondary battery cell, comprising:
  a first electrode, comprising a first active material disposed on a surface of a first current collector;
  a second electrode, comprising a second active material disposed on a surface of a second current collector;
  a separator disposed between the first electrode and the second electrode;
  a plurality of first tab units arranged in pairs, disposed in the first current collector, two tab units in each pair are respectively located on an upper and a lower side of a winding starting section of the first electrode along a thickness direction of the cell;
  a second tab, disposed in the second current collector; and
  a second insulating tape, disposed to cover a second region of the second electrode, the second region facing and aligned to a first tab accommodating groove;
  wherein the first electrode comprises the first tab accommodating groove defined by the first current collector as a bottom and the first active material as a peripheral side, to accommodate a first tab unit of the each pair of first tab units in the plurality of first tab units.

2. The cell according to claim 1, wherein the peripheral side of the first tab accommodating groove comprises one opening and three side walls; or,
the peripheral side of the first tab accommodating groove comprises two openings and two side walls.

3. The cell according to claim 1, wherein the second electrode further comprises a first contrapuntal groove, facing to the first tab accommodating groove.

4. The cell according to claim 3, wherein a length and a width of the first contrapuntal groove are greater than a length and a width of the first tab accommodating groove, respectively.

5. The cell according to claim 1, further comprises:
a first insulating tape, disposed in a first region of the second electrode, wherein the first region faces to a first head of the first electrode disposed in the winding starting section thereof.

6. The cell according to claim 5, wherein the second electrode further defines a groove, formed in the first region of the second electrode; and the first insulating tape covers the groove.

7. The cell according to claim 1, wherein a width and a length of the second insulating tape are 1 to 1.5 times of a width and a length of the first tab accommodating groove, respectively.

8. The cell according to claim 1, further comprises:
a third insulating tape, disposed to cover the second tab and a portion of a second tab accommodating groove around the second tab.

9. The cell according to claim 8, wherein a width and a length of the third insulating tape are 0.5 to 1.5 times of a width and a length of the second tab accommodating groove, respectively.

10. The cell according to claim 1, wherein the second electrode further comprises: a first recess, disposed opposite a second tab accommodating groove, and the first recess is defined by the second current collector as a bottom and the second active material as a peripheral side.

11. The cell according to claim 10, further comprises a fourth insulating tape, disposed to cover the first recess.

12. The cell according to claim 11, wherein a width and a length of the fourth insulating tape are 0.5 to 1.5 times of a width and a length of the second tab accommodating groove, respectively.

13. The cell according to claim 1, wherein the first electrode further comprises:
a second recess, disposed opposite the first tab accommodating groove;
the second electrode further comprises:
a second contrapuntal recess, disposed to face the second recess, wherein a length and a width of the second contrapuntal recess are greater than a length and a width of the second recess, respectively.

14. The cell according to claim 1, further comprises a fifth insulating tape, disposed to cover a third region of the second electrode, wherein the third region faces the second recess.

15. The cell according to claim 1, wherein only one surface of the first current collector on the winding starting section of the first electrode is arranged with the first active material layer.

16. The cell according to claim 1, wherein:
two projections of the first tab units in one pair of the first tab at least partially overlaps along a thickness direction of cell.

* * * * *